United States Patent [19]

Fuller

[11] Patent Number: 5,056,817
[45] Date of Patent: Oct. 15, 1991

[54] TEMPERATURE-RISE LIMITING AUTOMOBILE BRA

[75] Inventor: Kip L. Fuller, Littleton, Colo.

[73] Assignee: Innovision Technologies Group, Inc., Denver, Colo.

[21] Appl. No.: 499,988

[22] Filed: Mar. 27, 1990

[51] Int. Cl.$^5$ ............................................. B62D 25/00
[52] U.S. Cl. .................................. 280/770; 150/166; 296/136; 428/31; 428/919
[58] Field of Search ............... 428/31, 919; 150/166; 280/770; 296/136

[56] References Cited

U.S. PATENT DOCUMENTS

| | | | |
|---|---|---|---|
| 4,044,358 | 8/1977 | Manning et al. | 428/31 X |
| 4,686,127 | 8/1987 | Burns et al. | 428/31 X |
| 4,789,574 | 12/1988 | Selvey | 428/31 |
| 4,901,738 | 2/1990 | Brink et al. | 428/31 X |

Primary Examiner—Henry F. Epstein
Attorney, Agent, or Firm—Wood, Herron & Evans

[57] ABSTRACT

A flexible automobile bra securable to the exterior surface of an automobile is constructed of at least one panel which absorbs mechanical impact, provides mechanical stabilization to inhibit flapping under windy or high-speed conditions, faciltates water drainage, and limits temperature rise of covered portions of the vehicle. The bra comprises at least one panel having a first, non-abrasive layer; a second thermal radiation reflective layer which is also preferably a thermally conductive, radar reflective metal; a third layer of elastomeric reticulated foam, which can be a radar-absorbing type; and a fourth layer of water impervious material which is preferably water vapor permeable. In an alternative embodiment, the reflective second layer is eliminated.

16 Claims, 1 Drawing Sheet

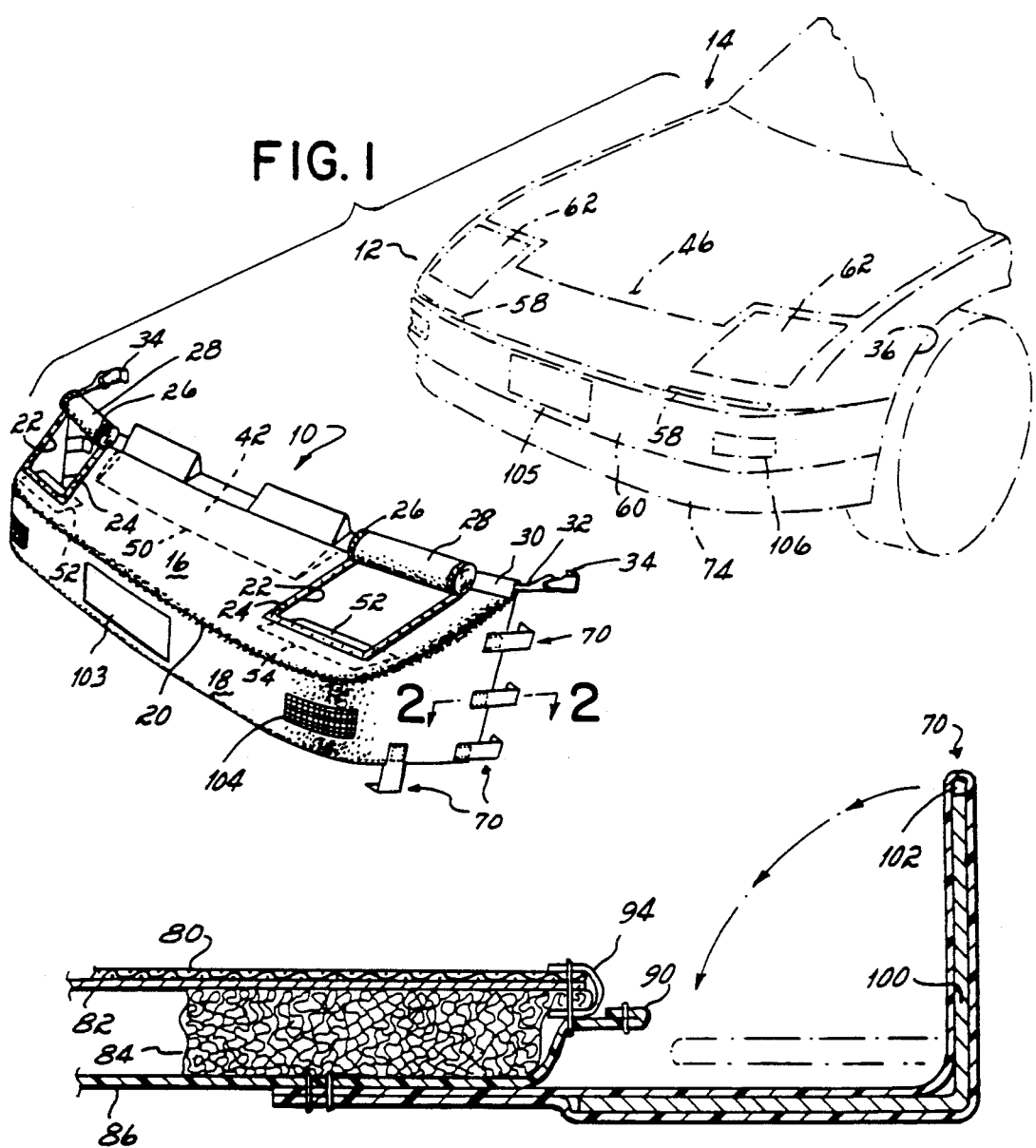

TEMPERATURE-RISE LIMITING AUTOMOBILE BRA

FIELD OF THE INVENTION

The invention pertains to the field of covers of the type securable to the front end of a vehicle such as an automobile to protect the finish of the vehicle from damage from flying road debris while driving and which are commonly referred to as automobile "bras." More particularly, the invention relates to an automobile bra having a flexible construction which not only absorbs impact energy, but which also protects an automobile's finish from damage which can be caused by excessive flapping of the bra or by the heating of moisture trapped beneath the bra and which can be constructed to absorb radar in order to reduce the distance at which police radar can measure the speed of the automobile.

BACKGROUND OF THE INVENTION

It has been known in the art to provide a removable cover or shield for protecting the front end of a vehicle from impact damage due to flying road debris. Covers of both rigid and flexible construction have been known. For example, U.S. Pat. No. 4,376,546 to Guccione et al. discloses a vehicle front end shield constructed of either one or two panels of rigid, hard plastic, such as PVC which conform to the contours of the exterior surface of the vehicle. The panels are supported spaced slightly above the surface of the vehicle by a soft spacer element which may take the form of a continuous peripheral resilient bead, thereby preventing the cover from contacting the surface to avoid scratching and discoloration due to leaching. While providing excellent mechanical protection, such rigid covers are expensive to manufacture due to both tooling and material costs. They are also bulky and difficult to store compactly. While the storage problem can, to some extent, be overcome by forming the cover in multiple pieces, doing so interrupts the smooth contours essential to an attractive appearance and complicates installation and removal of the cover.

A flexible automobile bra is described in U.S. Pat. No. 4,219,218 to Waldon. That bra consists of a body having an exterior vinyl layer backed with a foam or felt lining on its underside. The bra is draped over the front end of a car and secured to its exterior surface by a series of fasteners which engage the automobile at various locations, such as the undersides of the fender wells and bumper. Flexible bras of such a construction do offer a degree of protection against chips and scratches from small flying objects. However, such covers themselves can also seriously damage an automobile's finish.

Because they directly contact the surface of an automobile, moisture from rain or ambient humidity becomes trapped between the underside of the bra and the automobile's finish. Since modern automobile finishes are highly impervious to water, trapped moisture alone does not normally damage the finish. However, sunlight impinging on the exterior of the cover can cause a build up of heat beneath the bra which can cause a temperature rise large enough that moisture trapped against the surface of the car approaches or even exceeds the boiling point. Under such conditions, the automobile's surface finish can be literally "cooked" causing discoloration, loss of adhesion and/or blistering.

Another problem which has plagued flexible automobile bras in the past is that they have a tendency to flap and beat against the automobile's finish especially when driving under high speed or windy conditions. Within a very short time, such flapping can abrade the automobile's surface finish, no matter how soft the material on the underside of the bra. This is particularly true when even a small amount of dirt is present under the bra.

It has also been known to provide rigid automobile protective covers with a coating of radar-absorbing paint in order to reduce the distance at which the speed of a vehicle can be measured by a police radar unit. This is desirable because it has been found that speed measurements taken using radar at long distances can be incorrect due to limitations of the radar equipment, as well as errors in aiming it accurately. By reducing the distance at which a vehicle's speed can be measured, the use of a radar-absorbing cover reduces a motorist's likelihood of being subjected to the inconvenience and expense which can ensue from an improper charge of speeding. While a rigid cover can be painted with multiple coats of radar-absorbing paint in order to build up a series of layers whose overall thickness provides sufficient radar absorption, such coating technology does not lend itself to the production of a flexible bra due to the lack of a rigid substrate for carrying such paints.

SUMMARY OF THE INVENTION

In view of the shortcomings of the prior art as described above, there is a need for a flexible automobile cover which offers enhanced impact absorption but which is more economical to make and easier to store than a rigid cover.

There further exists a need for an automobile bra offering the above advantages but which does not present a risk of damaging the finish of an automobile due to either excessive flapping or the heating of moisture trapped beneath the cover.

There is also a need for a bra which offers all of the above advantages and which optionally may be provided with radar absorbing characteristics to limit the distance at which the speed of a vehicle on which the bra is used can be measured by police radar.

The present invention fulfills the above needs by providing a bra for an automobile which is constructed of a special flexible panel. In accordance with the invention, the panel is constructed of a number of superposed layers including a non-abrasive backing layer, a metallic foil layer, a resilient reticulated foam layer and a waterproof exterior layer.

The reticulated foam, which is preferably a polyurethane type capable of withstanding elevated temperatures without becoming brittle serves a number of important purposes. The foam lends body to the panel thereby lessening any tendency to flap under high speed or windy conditions. The foam also serves as a cushion layer which, although being light in weight, absorbs mechanical impact energy and helps to distribute impact forces over a wider area. Due to its open cell, reticulated structure, the foam also facilitates drainage of trapped water and provides a layer of thermal insulation. The outer cover layer is preferably a "breathable" material impervious to water in liquid form but permitting the passage of water vapor. The open structure of the reticulated foam facilitates the evaporation of moisture thereby producing an evaporative cooling effect.

In an alternative embodiment, the reticulated foam can be a radar absorbing type such as a type treated with a graded conductive carbon coating to provide radar absorption.

The metallic foil layer underlying the reticulated foam provides a number of additional advantages. Where the foam is a radar-absorbing foam, the foam is preferably of a thickness equal to an odd quarter wave length of police radar. Radar passing through the foam and partially absorbed thereby will be reflected by the metal layer back through the foam for additional absorption. Moreover, due to the selection of the thickness of the foam, radar reflected back to the incident surface of the foam will be 180° out of phase with the incident radar thereby further weakening both the incident and reflected radar signals due to phase cancellation.

The metallic layer also cooperates with the reticulated foam layer to limit the temperature rise at the vehicle's surface. Thermal radiation incident upon exterior of the cover is reflected by the metallic layer rather than being permitted to pass through to the surface of the vehicle. While this warms the air inside the reticulated foam, the open structure of the foam permits the flow of convection currents which assist in carrying heat away from the surface of the vehicle. In addition to reflecting thermal radiation, the metallic layer is also preferably a highly thermally conductive material such as aluminum or gold which helps prevent the formation of hot spots beneath the cover by spreading the heat over a larger area from which it can be more readily dissipated by re-radiation as well as the action of the convection currents established in the foam layer.

Additional advantages and features of the various aspects of the present invention will become apparent to those skilled in the art upon review of the following detailed description of the invention taken in conjunction with the accompanying drawings wherein like reference numerals denote like items and in which:

BRIEF DESCRIPTION OF THE DRAWINGS

FIG. 1 is a perspective view of an automobile bra constructed in accordance with the present invention shown opposite the front end of an automobile upon which the bra is to be mounted.

FIG. 2 is a cross-sectional view taken along Line 2—2 of FIG. 1.

FIG. 3 is an exploded perspective view of the panel material from which the bra of FIG. 1 is constructed showing the structure and arrangement of the various layers thereof.

FIG. 4 is an exploded perspective view of an alternative panel material from which an automobile bra may be constructed.

DETAILED DESCRIPTION OF THE DRAWINGS

Referring to FIG. 1 there is shown a flexible bra 10 of a size and shape generally conforming to that of the exterior surface of the front end portion 12 of a particular arbitrarily selected automobile 14. Bra 10 is constructed from multiple layer panels 16 and 18 which are joined along seam lines such as seam line 20 by any suitable means such as sewing. In the illustrated embodiment, panel 16 includes a pair of rectangular headlight openings 22 each of which is bounded on three sides by a strip 24 of loop material of the type used for hook and loop fasteners. Mating strips of hook material 26 are provided along the underside of a pair of headlight flaps 28 which are preferably closed for daylight driving. For night driving, flaps 28 can be rolled up as shown and held securely in place by means of mating strips of hook and loop material (not shown) provided in mating locations on the underside of headlight covers 28 and a seam pocket 30 which spans the width of panel 16. To help secure bra 10 snugly to the front end 12 of automobile 14, an elastic draw cord 32 is provided. Draw cord 32 has clips 34 at each end for engaging the underside of the fender well 36 of automobile 14.

In the illustrated embodiment, a hood pocket 42 is provided for further securing bra 10 in place by receiving within pocket 42 the front end portion 46 of the hood of automobile 14. Pocket 42 is conveniently formed by joining a piece of reinforced vinyl or other strong material to the underside of panel 16 along a seam line 50. Alternatively, hood pocket 42 may comprise a sheath entirely separated from panels 16 and 18 and which slips over the hood of the automobile 14 and is fastened to the underside thereof by means of hooks and elastic cords in the manner well known in the art.

To further secure bra 10 to automobile 14, a pair of substantially rigid insert strips 52 are secured to the underside of panel 16 along hinge lines 54. When bra 10 is installed, the free ends of insert strips 52 are slipped inside slots 58 located just above the bumper 60 of vehicle 14 in the areas below its headlight covers 62. The sides and lower portion of panel 18 are also provided with a plurality of bendable tabs 70 for further securing bra 10 to automobile 14 by engaging the insides of its fender wells 36 as well as the underside of the cowling 74 located beneath the bumper 60 of vehicle 14.

Referring now to FIG. 2, it can be seen that panel 18 comprises a soft, nonabrasive first layer 80 which faces the exterior finish of automobile 14, a metallic second layer 82 overlying the first layer, a reticulated foam third layer 84 overlying the second layer and a waterproof fourth layer 86 overlying the third layer. The makeup of layers 80, 82, 84 and 86 will be described in further detail with reference to FIG. 3. For present purposes, it is sufficient to note that the free edge of fourth layer is folded over on itself and sewn as illustrated at 90 while the free edges of layers 80, 82 and 84 are gathered and sewn inside a peripheral seam binding 94 as illustrated. Tabs 70 are formed by enclosing a strip 100 of yieldably deformable metal inside a pocket 102 of material secured to fourth layer 86 by sewing or other suitable means.

The advantages of the present invention derive principally from the composition and arrangement of the layers 80, 82, 84 and 86, which make up not only panel 18, but also, panel 16 and preferably, every other exposed portion of bra 10 including headlight flaps 28 and a removable license plate cover 103.

First layer 80 is a layer of material selected to be non-abrasive to the surface finish of automobile 14 and may suitably comprise a woven fabric or a non-woven fabric such as a felt of cotton or cotton blend having a thickness of approximately 0.44 inches.

Second layer 82 is a metallic layer reflective to both thermal radiation and police radar in the X and K bands. Layer 82 is also preferably of a material such as an aluminum foil having a thickness on the order of 0.001 inches to 0.005 inches. Equivalent properties can also be obtained using a significantly thinner foil of gold. To facilitate its handling during manufacture, as well as to provide an anti-oxidation barrier, second layer 82 may optionally be enveloped in a thin layer of clear plastic on one or both sides.

In accordance with the invention, third layer 84 comprises a layer of resilient, reticulated foam of a material such as polyurethane which provides long life at the temperatures normally encountered when bra 10 is in use without embrittlement or other significant degradation. In embodiments where radar-absorbing properties are not of concern, layer 84 may suitably comprise any suitable reticulated elastomeric foam in a thickness in the range of about ¼ inch to ½ inch, and preferably about ⅜ inches. An example of a suitable foam is a reticulated polyether type having a density of about 1.8 lb/cubic foot, a tensile strength of about 13 psi, a tear strength of about 2 psi, a maximum elongation of about 200%, a 50% compression set of about 6 and a porosity of about 20 pores per inch. Such a material is available commercially from E. N. Murray Co. of Denver, Colo. and provides significant absorption and dispersion of impact energy from flying road debris, such as stones, striking bra 10 when installed on an automobile travelling at highway speeds as well as good thermal properties.

In an alternative embodiment, third layer 84 comprises a reticulated foam treated for radar absorption which, in cooperation with radar-reflective second layer 82, acts to significantly decrease the distance at which an automobile 14 fitted with a bra 10 of the invention can be detected by police radar. Where radar-absorption is desired, third layer 84 preferably comprises a reticulated elastomeric foam such as a reticulated polyurethane foam treated with a graded, conductive carbon coating. A preferred material is that sold as Type LA-O under Part No. 8002 available from Plessey of San Diego, Calif. In a layer ⅜ inches thick, this material provides an attenuation of −20 dB of electro-magnetic radiation in the range of 10 to 18 GHz, and is characterized mechanically as having a density of approximately 3 pounds per cubic foot, a minimum tensile strength of about 10 psi, a tear strength of about 2.5 pounds per maximum elongation of about 300% and a 50% compression set of about 15.

First layer 80 comprises a layer which is tough, resistant to degradation from sunlight and impervious to water in liquid form, but is preferably water vapor permeable. A material having these characteristics which also has an attractive simulated leather surface appearance is available, such as NAUGAHYDE. Also available is Type PHANTOM, 16 Gauge, available from Intex Plastics, Inc. of Long Beach, Calif.

Bra 10 is installed on vehicle 14 by draping bra 10 over front end portion 12. The hood of the vehicle is opened slightly and slipped inside hood pocket 42, and headlight openings 22 are aligned with the headlight covers 62, and a pair of openings 104 are aligned with the automobile's turn signals and license plate cover 103 is aligned with its license plate holder. Next, inserts 52 are inserted into slots 58 and the clips 34 on each end of elastic draw cord 32 are secured on the underside of fender well 36. Thereafter, each tab 70 is bent into a "U" or "V" shape to secure the peripheral edges of bra 10 to the inside of fender well 36, as well as to the underside of cowling 74. For final fitting, the bra 10 should be smoothed out starting near the center of the automobile 14 and working toward the sides, pressing and smoothing bra 10 against the contours of the automobile and making sure all openings in bra 10 aligns properly with any vents, turn signals, grills, etc. Finally, the hood of the vehicle is closed tightly. For daylight driving, headlight flaps 28 should be rolled down and securely fastened in place by means of hook and loop strips 24 and 26. For night driving, flaps 28 should remain rolled up as shown in FIG. 1. Once bra 10 is secured to automobile 14 as just described, the automobile can be operated as usual, under high wind conditions without danger of cover 14 loosening or slapping against the exterior of the car. By reversing the above steps, bra 10 can be easily removed from automobile 14 and, owing to its flexible construction, folded compactly for storage.

In operation, bra 10 serves to significantly reduce the temperature rise to which covered portions of the vehicle 14 would otherwise be subjected when bra 10 is exposed to hot, sunny conditions. In tests wherein the exterior of bra 10 was subjected to heating from heat lamps, bra 10 having the multiple layer construction described above with reference to FIG. 3 was found to limit the temperature rise of covered portions of an automobile to a temperature about 100° F. lower than the temperature rise permitted by a bra of conventional construction.

While not wishing to be limited to any particular theory of operation, it is believed that thermal radiation incident upon the fourth layer 86 of bra 10 is reflected by the second layer 82 back toward fourth layer 86. While fourth layer 86 can itself become quite hot, the reticulated foam third layer 84 provides an insulating barrier which prevents the conduction of heat from fourth layer 86 downwardly toward the surface of automobile 14, which is also thermally insulated from metallic third layer 84 by non-abrasive first layer 80 which lies between metallic layer 84 and the automobile's surface. Additionally, any localized hot spots due, for example, to the angle of incidence of solar rays upon a particular area of bra 10 are dissipated owing to the high thermal conductivity of second layer 82. Heat in the metallic second layer 82 is dissipated by two mechanisms. First, layer 82 will re-radiate heat exteriorly back through first layer 80. In addition, the reticulated, open-cell structure of third layer 84 permits the flow of convective air currents which carry heat away from second layer 82. Thus, even though first layer 80 is capable of holding some amount of moisture, the structure of bra 10 limits the temperature rise of the covered surface of the vehicle so that any trapped moisture cannot be heated to a degree deleterious to the surface finish.

Reticulated foam third layer 84 also offers additional advantages. Water flows readily through its open structure to facilitate drainage, thereby preventing bra 10 from sagging due to water logging. Any water which might remain lying between second layer 82 and fourth layer 86 evaporates into the free air space inside foam layer 84 whereupon it can pass in the form of water vapor which can pass through water vapor permeable fourth layer 86. This evaporative effect further enhances the conduction of heat away from first and second layers 82. Foam layer 84, while being light and flexible, also adds a degree of body to bra 10 for mechanical stabilization. This helps to prevent bra 10 from flapping and beating against the finish of the automobile under windy or high speed driving conditions.

Where, in accordance with the alternative embodiment described above, reticulated foam third layer 84 is a radar-absorbing material, the distance at which police radar can measure the speed of a vehicle equipped with bra 10 is significantly reduced. X or K band radar waves incident upon bra 10 pass through fourth layer 86 and into the radar absorbing reticulated foam third layer 84, whereupon they are significantly absorbed. The attenuated radiation then strikes radar-reflective second layer 82 whereupon it is reflected back through layer 84 for even further absorption. Moreover, where the thickness of third layer 84 is selected to lie within the aforementioned ¼ to ½ inch range and is further selected to equal and odd quarter multiple (e.g., ¼, ¾, etc.) of the wavelength of the incident radar waves, the reflected radar signal will meet the incident signal entering layer 84 at 180° out of phase therefrom. Accordingly, the reflected radar signal as well as the incident signal are both further attenuated due to the phenomenon of phase cancellation, otherwise known as destructive interference.

Referring now to FIG. 4 there is illustrated an alternative panel material from which panels 16, 18 and/or other exposed portions of the bra 10 of FIG. 1 including headlight flaps 28 and license plate cover 103 may be constructed in accordance with a further alternative embodiment. According to this alternative embodiment, metallic reflective layer 82 is eliminated such that the panel comprises a first, non-abrasive layer 80, a second layer 84 of reticulated elastomeric foam overlying the first layer 80 and a fourth, water-impervious layer 86 overlying the second layer. Layers 80, 84 and 86 are as described earlier with reference to FIG. 3. In particular, reticulated foam layer 84 may comprise either a radar-absorbing type or a non-radar-absorbing type such as those described above and is also of a thickness in the range of about ¼ to ½ inch and preferably about ⅜ inches.

While not offering all the advantages of a bra constructed of the panel material of FIG. 3, a bra 10 constructed of the panel material of FIG. 4 offers a number of the same important advantages. The reticulated foam layer 84 provides enhanced protection from mechanical impact and lends body to bra 10 thereby providing mechanical stabilization to help prevent the bra from flapping. The reticulated foam layer 84 also thermally insulates layer 80 and the surface of the automobile 14 from the high temperatures which exterior layer 86 can reach. In addition, the open structure of layer 84 facilitates water drainage and permits the flow of convection air currents which also help to prevent layer 80 and the surface of vehicle 14 from reaching excessive temperatures.

While the embodiments described above illustrate the invention, it is to be understood that the invention is not limited to those particular forms, and that in light of the present disclosure, those skilled in the art will recognize various changes which may be made without departing from the legal scope of the invention as particularly pointed out and distinctly claimed in the appended claims.

What is claimed is:

1. A bra for covering an exterior surface of an automobile, said bra comprising:
   (a) at least one panel of a size and shape conformable to said surface, said panel including:
      (i) a first layer non-abrasive to said surface;
      (ii) a second layer reflective of thermal radiation, said second layer overlying said first layer;
      (iii) a third layer of reticulated foam, said third layer overlying said second layer, and
      (iv) a fourth layer impervious to water in liquid form, said fourth layer overlying said third layer, and
   (b) means for securing said panel to the automobile with said first layer facing said exterior surface and said fourth layer exposed.

2. The bra of claim 1 wherein said second layer comprises a metallic foil layer.

3. The bra of claim 2 wherein said metallic foil comprises aluminum foil.

4. The bra of claim 2 wherein said metallic foil comprises gold foil.

5. The bra of claim 1 wherein said reticulated foam is a polyurethane foam.

6. The bra of claim 1 wherein said reticulated foam is an elastomeric, radar-absorbing foam.

7. The bra of claim 1 wherein said reticulated foam is a radar-absorbing foam and said second layer is a layer reflective of radar as well as thermal radiation.

8. The bra of claim 1 wherein said fourth layer is a layer permeable to water vapor.

9. A bra for covering an exterior surface of an automobile, said bra comprising:
   (a) at least one panel of a size and shape conformable to said surface, said panel including:
      (i) a first layer non-abrasive to said surface;
      (ii) a second layer of a metal reflective of thermal radiation, said second layer overlying said first layer;
      (iii) a third layer of reticulated foam, said third layer overlying said second layer, and
      (iv) a fourth layer impervious to water in liquid form and permeable to water vapor; and
   (b) means for securing said panel to the automobile with said first layer facing said exterior surface and said fourth layer exposed.

10. The bra of claim 9 wherein said reticulated foam is a radar-absorbing foam and said second layer is a metal reflective of radar as well as thermal radiation.

11. The bra of claim 10 wherein said metal comprises a member of the group consisting of aluminum and gold.

12. The bra of claim 9 wherein said reticulated foam is a polyurethane foam.

13. A bra for covering an exterior surface of an automobile, said bra comprising:
   (a) at least one panel of a size and shape conformable to said surface, said panel including:
      (i) a first layer non-abrasive to said surface;
      (ii) a second layer of reticulated foam, said second layer overlying said first layer, and
      (iii) a third layer impervious to water in liquid form, said third layer overlying said second layer, and
   (b) means for securing said panel to the automobile with said first layer facing said exterior surface and said third layer exposed.

14. The bra of claim 13 wherein said reticulated foam is an elastomeric foam.

15. The bra of claim 13 wherein said reticulated foam comprises a radar-absorbing material.

16. The bra of claim 13 wherein said third layer is a layer permeable to water vapor.

* * * * *

UNITED STATES PATENT AND TRADEMARK OFFICE
CERTIFICATE OF CORRECTION

PATENT NO. : 5,056,817
DATED     : October 15, 1991
INVENTOR(S) : Kip L. Fuller

It is certified that error appears in the above-identified patent and that said Letters Patent is hereby corrected as shown below:

Title Page:
In the Abstract Line 5 "faciltates" should be --facilitates";

In Column 5, Line 40, after "per" insert --inch, a porosity of 5-25 pores per inch, an ultimate--

Signed and Sealed this

Thirteenth Day of April, 1993

Attest:

STEPHEN G. KUNIN

*Attesting Officer*     *Acting Commissioner of Patents and Trademarks*